US012286271B2

(12) United States Patent
Hoorens Van Heyningen (10) Patent No.: US 12,286,271 B2
(45) Date of Patent: Apr. 29, 2025

(54) METHOD FOR PROVIDING A TRANSPORT CONTAINER, TRANSPORT CONTAINER, METHOD FOR IDENTIFICATION AND/OR TRACKING AND/OR TRACING OF A TRANSPORT CONTAINER AND COMPUTER-READABLE MEDIA

(71) Applicant: Greif International Holding B.V., Amstelveen (NL)

(72) Inventor: Diederik Hoorens Van Heyningen, Europoort (NL)

(73) Assignee: Greif International Holding B.V., Amstelveen (NL)

( * ) Notice: Subject to any disclaimer, the term of this patent is extended or adjusted under 35 U.S.C. 154(b) by 564 days.

(21) Appl. No.: 17/614,006

(22) PCT Filed: May 29, 2019

(86) PCT No.: PCT/EP2019/064077
§ 371 (c)(1),
(2) Date: Nov. 24, 2021

(87) PCT Pub. No.: WO2020/239223
PCT Pub. Date: Dec. 3, 2020

(65) Prior Publication Data
US 2022/0219863 A1 Jul. 14, 2022

(51) Int. Cl.
*G06Q 10/0833* (2023.01)
*B65D 25/20* (2006.01)

(52) U.S. Cl.
CPC ....... *B65D 25/205* (2013.01); *G06Q 10/0833* (2013.01); *B65D 2203/06* (2013.01); *B65D 2203/10* (2013.01)

(58) Field of Classification Search
CPC .......................... G06Q 10/0833; G06Q 10/083
See application file for complete search history.

(56) References Cited

U.S. PATENT DOCUMENTS

| 2007/0132547 A1 | 6/2007 | Jung |
| 2014/0157731 A1* | 6/2014 | Perazzo ................. B65B 3/003 141/2 |

(Continued)

OTHER PUBLICATIONS

RFID4u, "Returnable Shipping Asset Tracking System," rfid4u. com, 2016, Retrieved from https://rfid4u.com/wp-content/uploads/2015/12/Returnable-Asset-Tracking-White-Paper.pdf (Year: 2016).*

(Continued)

*Primary Examiner* — Rupangini Singh
*Assistant Examiner* — Bryan J Kirk
(74) *Attorney, Agent, or Firm* — Erik J. Overberger; RANKIN, HILL & CLARK LLP (57) ABSTRACT

The invention refers to a method for providing a fillable transport container, whereby a transport container is provided with a first sealing component, comprising a first identification means, and with a second sealing component, comprising a second identification means, and with a container identification means on the transport container, whereby a first combined information and/or a second combined information are stored in the database means (100) such that the transport container with the first and second sealing components is uniquely identifiable and/or trackable and/or traceable. The invention further refers to a transport container, a method for identification and/or tracking and/or tracing of a transport container and a computer-readable media.

17 Claims, 2 Drawing Sheets

(56) References Cited

U.S. PATENT DOCUMENTS

2014/0330685 A1* 11/2014 Nazzari ............... G06Q 10/083
                                                         705/28
2018/0148237 A1    5/2018 Sibley et al.
2018/0336753 A1   11/2018 Cantley et al.
2019/0026511 A1*  1/2019 Whittington ......... G06K 7/1413

OTHER PUBLICATIONS

International Search Report dated Jul. 8, 2019; Application No. PCT/EP2019/064077; 2 pages.

* cited by examiner

METHOD FOR PROVIDING A TRANSPORT CONTAINER, TRANSPORT CONTAINER, METHOD FOR IDENTIFICATION AND/OR TRACKING AND/OR TRACING OF A TRANSPORT CONTAINER AND COMPUTER-READABLE MEDIA

The invention refers to a method for providing a transport container, a transport container, a method for identification and/or tracking and/or tracing of a transport container and a computer-readable media.

The process of providing transport containers, filling these transport containers with a respective filling material and their subsequent delivery to a distributor or end user can be affected by counterfeiting, intermediate and unexpected damage of a tamper evidence or the like.

However, by solely providing e.g. single identification means such as QR codes, there is no possibility to identify the respective transport container and its history during the whole handling process from its manufacturing to its delivery to the end user in a secure and indisputable manner.

Thus, there is a need for providing a system, which allows for gapless detection and identification of transport containers such as e.g. transport drums or the like. It is an object of the invention to provide a method which allows for uniquely identifying, tracking and tracing a transport container in order to make information available about e.g. the processing history, the current status, etc. in an easy, safe and cost-efficient manner. Further, it is an object of the invention to provide a transport container, a method for identification and/or tracking and/or tracing of a transport container and a computer-readable media.

Referring to the method for providing a transport container, the object is solved by independent claim 1, with regard to the transport container by claim 15, with regard to the method for identification and/or tracing of a transport container by claim 16 and with regard to the computer-readable media by claim 17. Preferable embodiments are disclosed by the dependent claims respectively.

According to the present invention, the method for providing a, fillable transport container, in particular a transport drum, comprising the following steps:
  providing a first sealing component with a first identification means, which comprises first identification information, and a second sealing component with a second identification means, comprising second identification information,
  providing a transport container comprising at least a body and at least a second sealable opening,
  providing a container identification means, comprising container identification information, on the transport container, preferably on the body of the transport container,
  sealing the transport container, preferably the first sealable opening, with the first sealing component,
  scanning the first identification means and the container identification means,
  sending the first identification information and the container identification information to the database means,
  storing the first identification information and the container identification information in the database means,
  preferably linking the first identification information and the container identification information to create a first combined information,
  filling the transport drum with a filling material, preferably via the second sealable opening,
  sealing the second sealable opening of the transport container with the second sealing component,
  scanning the first identification means, the second identification means and the container identification means,
  sending the first identification information, the second identification information and the container identification information to the database means (100),
  storing the first identification information, the second identification information and the container identification information in the database means (100),
  linking the first identification information, the second identification information and the container identification information to create a second combined information,
  whereby the second combined information represents a physical combination of the transport container, the first sealing component and the second sealing component, such that the physical combination is uniquely identifiable and/or trackable and/or traceable in a verifiable manner.

The present invention is based on the approach that the transport container or drum and its sealing component are linked to each other by respective identification means. This linkage is achieved by linking/associating the respective identification information comprised by the identification means in a database means. Thus, the data as stored in the database means represent/reflect the physical combination of the transport container with the respective first and second sealing component in form of an uniquely identifiable sealing.

After having once connected these pieces of identification information, preferably by the database means, the transport container is sealed and its history and/or origin can be identified, tracked and traced by scanning and validating all of the identification means being linked to each other by the associated information in the database means, namely by the first and/or second combined information as stored in the database means.

The first and second sealing component can be provided as sealing caps. The first sealing component can be e.g. a ¾ inch sealing cap, whereby the second sealing component can be e.g. a two inch sealing cap.

Thus, by sequentially, stepwise providing and storing the linked information in the database means, the respective transport container is uniquely combined with the respective first and second sealing components.

The linking process for providing the first and second combined information can be proceeded by the database itself on receipt of the first, second and/or transport container information. Alternatively, the linking process can be proceeded by a handheld device or the like, such as e.g. a scanner for reading the various identification means, which preferably comprises a corresponding function or app for communicating with the database means and thus being capable of providing linkage of scanned identification means.

In consequence, the scanned information can be sent to the database means and linked afterwards, or can be linked and sent to the database afterwards. Finally, the database means stores the scanned and linked information such that the first and/or second combined information is/are available in the database means.

The database means can be provided in form of a cloud network system. Thus, the stored information data are requestable and/or can be sent by different entities at different locations, such that the transport container can be identified, tracked and/or traced in a suitable manner along the whole process chain.

Preferably, the container identification means comprising the container identification information represents the leading code of the arrangement, in particular of the first and/or second combined information. Thus, a completely unique and randomized container identification means provides a reliable basis in order to provide a uniquely identifiable, trackable and traceable physical combination with the first and second sealing means, comprising the first and second identification means.

A verification of the combination of the transport container with the first sealing component and the second sealing component can easily be achieved by scanning/reading the first, second and container identification means and processing a comparison of the resulting combined data with the information data as stored in the database means. Thus, a gapless identification, tracking and tracing is available.

In a preferred embodiment, a first entity executes at least one of the following steps:
  providing the first sealing component to a second entity, and/or
  providing the second sealing component to a third entity, and/or
whereby the first and second sealing components once attached to the transport container are not detachable in an undamaged condition, such that the transport container is sealed in an uniquely identifiable manner.

In particular, the second and third entity can be entities, which are exclusively provided with the first and second sealing component respectively.

In order to provide a secure, preferably tamper-proof, sealing, the first and second sealing components are designed to be not detachable. Thus, the first/second sealing component can only be detached from the transport container by destructing the respective sealing component. Thus, the anti-counterfeiting measures can be provided in a visual manner, or subsequently by the unique combination of first, second and container identification means, which is preferably unavailable after replacement of a destructed sealing component, e.g. by a counterfeiting entity.

Further, the first sealing component can comprise a first identification means which can be, at least in some way, e.g. by an additional information comprising the entities name and/or code, unique for the second entity and the second sealing component can comprise a second identification means which can be, at least in some way, e.g. by an additional information comprising the entities name and/or code, unique for the third entity.

In a further preferred embodiment, the second entity executes at least one of the following steps:
  providing a container identification means on the transport container,
  sealing the transport container with the first sealing component, in particular the first sealable opening,
  scanning the first identification means and the container identification means
  sending the first identification information and the container identification information to the database means.

Thus, the first sealing component can be arranged at the transport container and the first combined information can be provided by the second entity preferably.

According to another embodiment of the invention, the third entity executes at least one of the following steps:
  filling the transport drum with a filling material,
  sealing the transport container, in particular the second sealable opening, with the second sealing component,
  scanning the first identification means, the second identification means and the container identification means
  sending the first identification information, the second identification information and the container identification information to the database means.

Thus, the second sealing component can be arranged at the transport container and the second combined information can be provided by the third entity preferably.

According to the invention, the first, second and third entities can be part of a single company or can be represented by different companies being independent from each other, but cooperating with each other in order to create a process chain for providing filled transport container to distributors and/or end users.

Consequently, the present invention provides linked information data, namely the first and/or second combined information being stored in the database means, which reflect the physical sealing of the transport container.

In particular, in case the first, second and third entity are represented by independent companies, it is possible to achieve a gapless identification/tracking/tracing by the present invention.

With the second entity e.g. creating and sending the first combined information, to be stored by the database means, and with the third entity e.g. creating and sending the second combined information, the history of the transport container and the involved entities are directly linked to the transport drum, in form of information data about the process chain and its status quo as well as in form of a physical seal by the first and second sealing component.

In one preferred embodiment of the invention, the first entity is a provider for the first and second sealing component, in particular in form of sealing caps, the second entity is a provider of the transport container and the third entity is a provider for filling the transport container with a filling material.

Thus, the method according to the invention can processed by a supply chain of different companies, cooperating with each other.

According to another embodiment, the first identification information and the second identification information at least comprise deviating identification numbers.

In a further embodiment, the container identification information at least comprises a unique identification number.

Thus, in particular by combining the first and second identification information, comprising randomized identification numbers, with the container identification information, comprising a unique identification number, unforeseeable, unique first and/or second combined information can be provided to and stored in the database means. Each transport container is labelled and identifiable due to its unique combination of first, second and container identification information, being linked to each other.

According to another embodiment,
  the first identification information further comprises at least one additional information, in particular a name and/or a code of the second entity, and/or
  the second identification information further comprises at least one additional information, in particular a name and/or a code of the third entity and/or
  the container identification information further comprises at least one additional information, in particular a name and/or a code of the third entity.

Thus, besides the respective identification number it is possible to add further information, preferably an arbitrary amount and type of additional information referring e.g. to details of the process chain, to the first identification information, the second identification information and/or the container identification information.

Exemplarily, by adding the names and/or codes of the own entity, preceding or subsequent entities to the first, second and/or container identification information, a gapless identification and/or tracking and/or tracing of the transport container can be achieved in form of the information data stored in the database means.

In another embodiment the first identification means, the second identification means and/or the container identification means is/are provided as QR code, data matrix, human readable code, data link, RFID-chip or the like.

Thus, the first, second and container identification means are preferably provided as well known and easily scannable codes, comprising the necessary information, but providing anti-counterfeiting measures simultaneously. Alternatively, the first, second and/or container identification means can be provided as different types of codes in order to provide a suitable encryption for the first, second and/or container identification information.

Furthermore, one of the identification, in particular the first or second identification means, can be printed on the inside of a cap in order to impede any manipulation of the sealed container. Alternatively, it is also possible to provide at least one of the identification means with some kind of invisible ink, which can be made visible by e.g. certain light wavelengths. Moreover, it is possible to provide identification means as codes, which are only readable by using some kind of further intelligence, such as the necessity to use a certain verified app with restricted access for identified customers. As a further option, e.g. an RFID-chip can be provided as at least one of the identification means in a manner, that the RFID-chip is going to be damaged as soon as one of the first and/or second sealing means is broken for opening of the transport container. Further safety measures, beyond the above-mentioned options, are conceivable as well.

According to another embodiment, the filled transport container, comprising the first and second sealing component, is provided to a fourth entity, in particular a distributor or end user for receiving the transport container being filled with a filling material and sealed by the first and second sealing components, whereby the second combined information further comprises at least one information about the fourth entity, preferably a name and/or a code of the fourth entity.

In consequence, the origin, the process history as well as its destination is available for every transport container. Hereby, the fourth entity can be represented by a distributor or an end user, which receives the filled transport container from the third entity. In this regard, the third entity can particularly be responsible for introducing the filling material into the transport container, providing the second sealing component to the transport container, preferably for sealing the second sealable opening along the body of the transport container, and scanning the first, second and container identification means, such that the linked, second combined information can be provided in the database means.

In a further embodiment, each scanning process of at least one of the first identification means, the second identification means and/or the container identification means for identification and/or tracking and/or tracing of the transport container is send to and stored in the database means, in particular linked to the first and/or second combined information by the database means.

Preferably, all three of the first identification means, the second identification means and the container identification means have to be scanned in order to receive any information about the respective transport container. Thus, it can be ensured, that not only the body of the transport container but the first and second sealing component are still present as well.

In consequence, the transport container is identifiable, trackable and traceable along the whole process chain, until it reaches its final destination. Any unrecognizable counterfeiting or damage of a tamper evidence can be avoided and tracked/traced by the unique combination of the information provided by the first, second and container identification means.

Furthermore, each scanning activity, preferably in combination with the current local position of the transport container at the time of the scanning process, can be send to and stored in the database means, in combination with the first and/or second combined information. Providing such a geo tagging function during scanning process can be ensured e.g. by providing a specific app which allows for scanning the codes in communication with the database means. Thus, the present location at each scanning process as well as the scanning process itself can be logged in the database means accordingly for providing a gapless identification, tracking and tracing of the transport container.

According to another embodiment, the database means comprises multiple authorization levels assigned to the different parts of the first and/or second combined information by the database means for
enabling amendment of the first and/or second combined information by adding and/or revising additional information to the first and/or second combined information, in particular such as entity names and/or codes, specifications of the filling material, date and time of processing the transport container or the like, and/or
enabling access for requesting and receiving information by a requesting entity according to its respective authorization level.

Thus, the database means can categorize the stored first and/or second combined information according to multiple authorization levels, in order to provide appropriate security measures against counterfeiting and corruption of stored data.

In another embodiment, the first and second sealing components are provided as sealing caps, preferably of different sizes, with the first and second identification means applied thereon.

Thus, the sealing component can be used for sealing e.g. the at least first sealable opening of the transport container. Furthermore, the sealing components represent a seal in form of a unique combination with the container identification means being applied to the body of the transport container.

According to a further embodiment, the database means is provided as a server, in particular as a network server for providing cloud-based services, capable of receiving information, storing information, linking information and/or comparing information for verification thereof and sending at least parts of stored information on request by a requesting entity, in particular according to the authorization level of the respective requesting entity.

Thus, the database means can be considered as a part of a network. By providing a data cloud, the database means in form of a server can be a globally available data storage for information verification in order to provide a transport container which is uniquely identifiable and/or traceable and/or trackable.

According to another aspect of the invention, a transport container is provided, in particular a transport drum or the like, preferably as provided by the method according to the present invention. The transport container comprises a body, in particular a drum body, at least the second sealable opening along the body, the first sealing component with the first identification means, the second sealing component with the second identification means and the container identification means, preferably provided along the body of the transport container.

Thus, a uniquely identifiable, trackable and traceable transport container is provided, whereby the physical sealing, in form of the first and second sealing components at the body of the transport container, is reflected by corresponding information data, namely the first and/or second combined information, as stored in the database means.

In another aspect of the invention, a method is provided for identification and/or tracking and/or tracing of a transport container according to the present invention by a requesting entity, comprising at least the following steps:

scanning at least two of the first identification means, the second identification and/or the container identification means, representing an identifying information, sending the identifying information to the database means, sending an authorization level of the requesting entity to the database means, comparing the received identifying information with first and/or second combined information as stored by the database means for identification of a transport container, comparing the received authorization level of the requesting entity with authorization levels as provided by the database means, providing parts of the first and/or second combined information corresponding to the identifying information and according to the authorization level of the requesting entity by the database means to the requesting entity, whereby the parts of the first and/or second combined information as provided by the database means represent a result of the verification process of the physical combination of the transport container, the first sealing component and the second sealing component, such that the physical combination is verifiable.

Thus, the extent of the information as provided to the requesting entity can be dependent on an authorization level of the requesting entity.

The requesting entity, sending a request for access to/receiving of information as stored in the database means, can be e.g. one of the first, second, third or fourth entity. Exemplarily, the requesting entity can be the fourth entity and thus a distributor and/or an end user.

Consequently, an entity such as a distributor or end user preferably has only restricted access to the information as stored in the database means in form of the first and/or second combined information. In contrast thereto, the first, second and third entity, scanning and providing the first, second and container identification means for the linking process, can be provided with higher authentication level and thus can have either unrestricted access to the stored information of the respective transport container, or can have partially restricted access.

Further, the respective entity can have unrestricted access to the information data as provided respectively. In this regard, the second entity can only have unrestricted access to the first combined information, whereas the third entity can be provided with unrestricted access only to the second combined information, as stored in the database means.

According to a further aspect of the invention, a computer-readable media is provided, having stored thereon instructions that when executed by a computing device, cause the computing device to implement a method for identification and/or tracing of a transport container according to the present invention.

In the following, the present invention will be described in more detail with reference to the enclosed Figure.

It is schematically shown.

Figure 1:
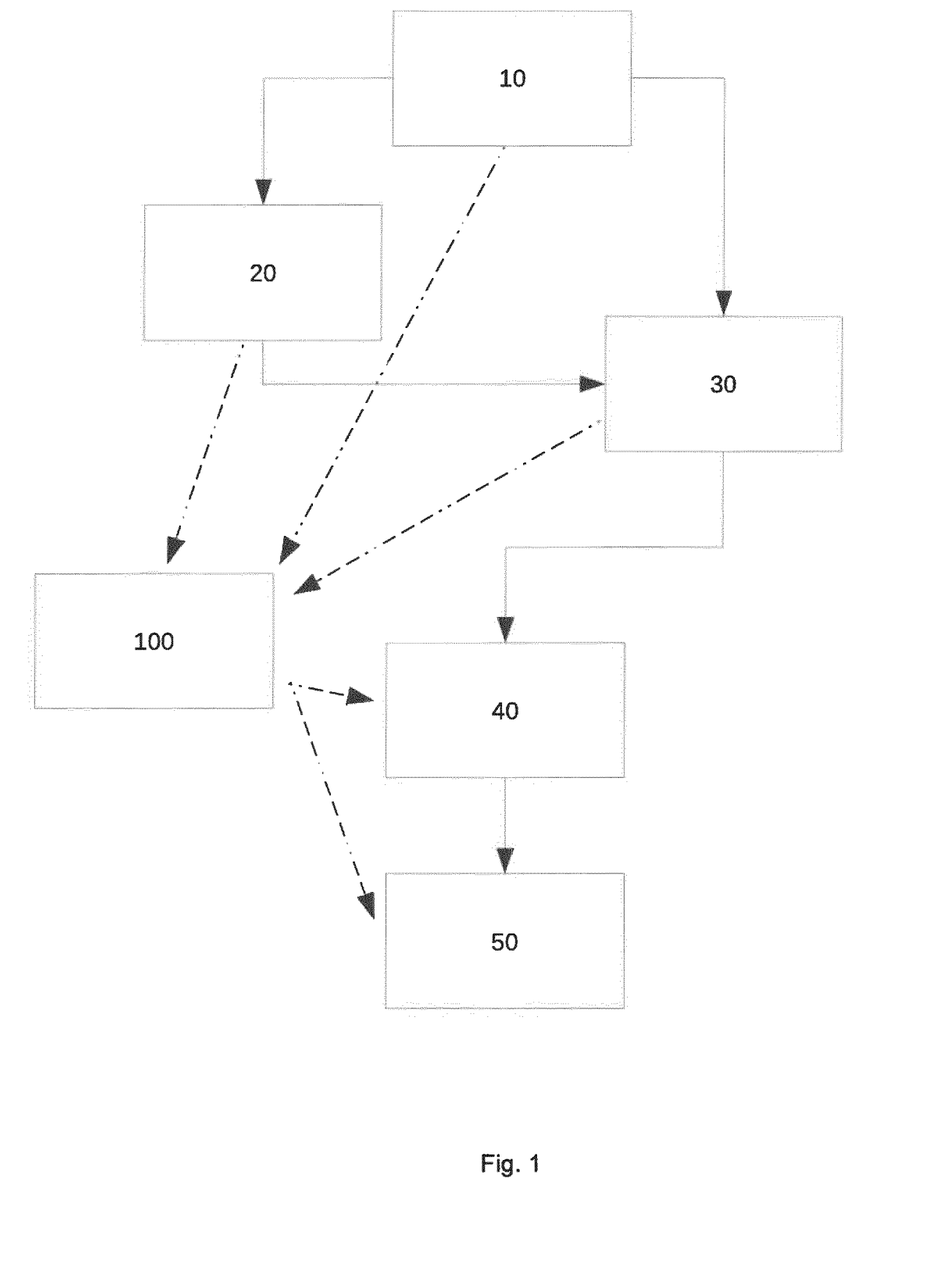
FIG. 1 flow chart illustrating the method for identifiable and/or trackable and/or traceable labelling of a fillable transport container.

According to FIG. 1 a first entity 10, a second entity 20, a third entity 30, a fourth entity 40 and a fifth entity 50 are provided as part of a process chain. Furthermore, a database means 100 is provided, which is capable of communicating with the different entities 10; 20; 30; 40; 50 respectively.

The first entity 10 can provide a first sealing component with a first identification means to the second entity 20 and a second sealing component with a second identification means to the third entity 30. The first identification means comprises an encoded first identification information, whereby the second identification means comprises an encoded second identification information.

In particular, the first and second sealing components can be provided as sealing caps or the like with the first and second identification means positioned along the caps. These caps may be of the same size or different sizes, such as e.g. ¾ inch size and/or 2 inch size.

Preferably, the first and second identification information can consist of a random identification number and further information, e.g. the name and/or code of the second or third entity 20; 30, respectively.

Furthermore, the first, second and container identification means are preferably provided as printed QR codes or the like. Alternatively, the first, second and container identification means can be provided in any other manner to ensure encryption of the first, second and container identification information.

The second entity 20 receives the first sealing component and provides a transport container, preferably a drum. The second entity 20 further provides a container identification means, preferably positioned along the body of the transport container, and seals the transport container, preferably a first sealable opening of the transport container, with the first sealing component. Afterwards, the second entity 20 scans or reads the first identification means as well as the container identification means and can a first combined information, which is sent to and subsequently stored in the database means. Alternatively, the first identification means and the container identification means can be linked to each other by the database means in order to provide the first combined information.

The container identification means can comprise a unique identification number, which uniquely identifies the respective transport container. Thus, by creating the first combined information, sent to and stored in the database means, the first sealing component and the transport container, namely the body of the transport container, are linked to each other on basis of the information data as stored in the database means as well as in a physical manner in form of the sealed connection.

In a next step, the second entity 20 delivers the transport container, including the first sealing component, to the third entity 30. The third entity preferably is responsible for filling the transport container with a filling material. Afterwards, the transport container, in particular a first sealable opening of the transport container, can be sealed with the second sealing component.

Subsequently, the third entity 30 reads/scans the first identification means, the second identification means and the container identification means. The resulting first, second and container identification information are linked and associated to each other in order to create a second combined information. This second combined information can further be amended by additional information such as date and time of filling, further specifications of the filling material, names and/or codes or preceding or subsequent entities, etc. Again, the linking process for creating the second combined information can be processed on side by the third entity 30, or by the database means in the course of the storage process itself.

Finally, the database means comprises information data, representing a unique association of a transport container body, a first sealing component and a second sealing component. In case at least one of the first and/or second sealing components is physically detached from the transport container, the respective sealing component is physically destroyed. Thus, the physical destruction of the respective sealing component is visible, as long as the sealing component is not exchanged by a counterfeiting entity.

However, if the destructed seal is replaced with any new sealing component by the counterfeiting entity, the unique second combined information of the respective transport container, by reading/scanning the unique combination of the container identification means, the first identification means and the second identification means, is no longer available for querying information from the database means due to the missing destructed first and/or second sealing component. The first and/or second combined information thus represent a verifying information of the physical seal of the transport container in order to provide anti-counterfeiting measures and a possibility for tamper detection. Thus, counterfeiting of transport container is impeded.

Furthermore, it is possible that each querying process itself, for receiving information from the database means by scanning/reading the container identification means, the first identification means and the second identification means, can be stored in the database means and can be linked to the respective first and/or second combined information, preferably in combination with any local position of the requesting entity in order to provide a location determination of the affected transport container.

In consequence, any counterfeiting or any destruction of the tamper evidence, thereby destroying e.g. the second sealing component, can be tracked and traced by the information data, namely the second combined data, as stored in the database means.

In a next step, the filled and sealed transport container is provided to a fourth entity 40 by the third entity 30. The fourth entity 40 can be a distributor, which hands over the transport container to a fifth entity 50, exemplarily representing an end user.

The fourth and fifth entity 40; 50 according to FIG. 1 preferably are only capable of reading/scanning the first, second and container identification means in order to receive at least a part of the information as stored in the database in form of the first and/or second combined information. The fourth and fifth entity 40; 50 are preferably provided with limited authorization levels, which do not allow full access to the database means but only limited access to specific and/or definable information.

Additionally, the second entity 20 can have full access only to the first combined information, whereas the third entity 30 can have full access only to the second combined data. Thus, by providing limited access for the different entities 10; 20; 30; 40; 50, the database means cannot be corrupted but represents a verification means in the light of the first and second combined information as provided.

Further, every scanning/reading process of the first, second and container identification means for identifying and/or tracking and/or tracing the transport container can be sent and logged in the database means, such that every reading/scanning process is associated with the first and/or second combined data in the database means. In consequence, it can be possible to identify the local GPS position and the respective date of each reading/scanning process for providing adequate tracking and tracing of the transport container.

Figure 2:
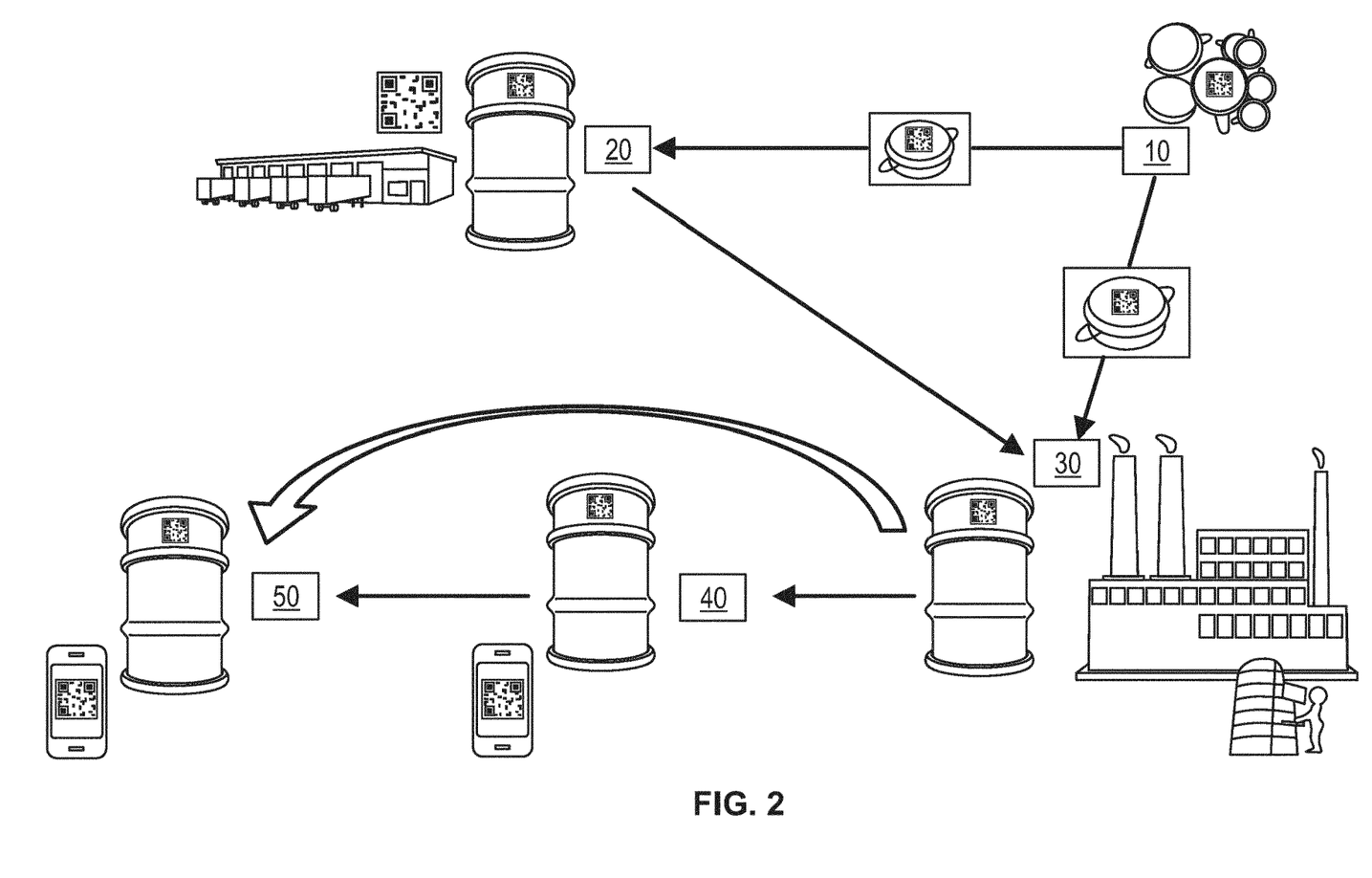
FIG. 2 illustration of a supply chain by which a transport container is provided and processed.

In FIG. 2 another illustration of a supply chain, by which a transport container is provided and processed, is shown.

According to FIG. 2, the first entity 10 is a provider of sealing caps as sealing components. A first sealing component/cap is provided to the second entity 20 being a provider of transport containers such as transport drums. A second sealing component is provided to the third entity 30 being a provider for filling transport container with respective filling material (so called "filler").

The first and second sealing caps comprise the first and second identification means being printed thereon in form of respective QR codes. Thus, the cap provider as first entity 10 can define a randomized code e.g. in combination with further information about the second and third entity 20; 30 respectively.

The first identification means can be represented by a QR code encoding a randomized number in combination with information about the second entity 20, whereby the second identification means can be provided as a QR code encoding a further randomized number in combination with information about the third entity 30.

The transport container/drum provider as second entity 20 receives the first sealing cap, which preferably is a ¾ inch sized sealing cap. Further, a transport container/drum with the unique, randomized container identification means being printed on the body of the transport drum is provided. In a next step, the transport drum, in particular a first sealable opening, is sealed/connected with the first sealing cap by the transport container provider 20. Afterwards, the container identification means and the first identification means are scanned/read by the transport container provider 20, resulting in the first identification information and the container identification information being linked to each other in order to form the first combined information, which is stored in the database means 100 (not shown in FIG. 2) subsequently.

Preferably, the database means 100 is provided as a server 100 within a network system, whereby the server 100 comprises a database being provided as a cloud-based service. Thus, information can be sent to the sever 100, stored on the server 100, received from the server 100 by an authenticated request as well as data comparisons in the course of data verification can be processed on/by/in cooperation with the server 100.

In a next step, the transport drum being sealed with the first sealing component by the transport container provider 20 is sent to the third entity 30 being a filler.

The filler 30, having received the transport drum in sealing connection with the first sealing component, as well as the second sealing component from the sealing component provider as first entity 10, introduces the respective filling material into the transport drum. After having filled the transport drum, the second sealing component is attached to the transport drum, in particular for sealing the second sealable opening of the transport drum. Thus, the transport drum is completely closed and finally sealed with the second sealing component by the filler 30.

The second sealing cap can be of the same size as the first sealing cap, preferably of a different size such as e.g. a two inch sealing cap.

Furthermore, the filler 30 scans/reads the first identification means, the second identification means and the container identification means, sends the information to the server as database means 100, in order to provide linking process and store the second combined information.

Additional information about a distributor as fourth entity 40 or and end user as fifth entity 50 can be added and linked to the second combined information by the filler 30.

In a next step, the filler as third entity 30 provides the filled and uniquely sealed transport drum, at this point representing a uniquely identifiable transport drum, to a distributor 40 or an end user 50.

When any person or entity, in particular the distributor 40 or the end user 50, tries to receive any information about the respective transport container by scanning/reading the physically combined first, second and container identification means, a request for information is sent to the server 100. The data request can be combined with a GPS position information of the requesting entity being e.g. the distributor 40 or the end user 50. Thus, the request process in combination with the current position of the transport drum can be stored and linked to the respective first and/or second combined information.

Additionally, the data request can be combined with sending an authentication level of the requesting entity. Thus, e.g. the distributor 40 can comprise a different or the same authentication level for receiving information about a transport drum from the server 100. In response to a data query on basis of the first and/or second combined information, the server 100 can provide information to the requesting entities on basis of the respective authentication levels.

In contrast thereto, the transport container provider 20 and the filler 30 can comprise higher authentication levels, which e.g. allow for modification of information data having been submitted earlier by the respective entity.

Further, in case a counterfeiting has took place by e.g. destroying and replacing the second sealing component, the reading/scanning process comprises the first identification information, whereby the second identification information is false. A data comparison on the server results in a verified match with the first combined information, whereby the linked second combined information results in no verified match. Thus, a counterfeiting is identified in case e.g. the second sealing component is replaced by a counterfeiting entity.

Consequently, the verification of the transport container/drum is negative and the distributor 40 or the end user 50 is notified about the counterfeiting. Delivery of a counterfeited transport drum, comprising a false, modified or replaced filling material, can be detected, identified, traced and/or tracked adequately. Further, the information about the counterfeiting can be stored and linked to the respective first and/or second combined information again.

In summary, the present invention is based on the approach that different entities create linked information in a stepwise manner, which are stored in a database means in order to provide verified information about the respective transport container. Further, the stored information reflect the physical connection of the first sealing component and the second sealing component with a specific transport container.

With the first, second and container identification means being available on the transport container, further entities such as distributors or end users can preferably receive limited information about the transport container, whereby the transport container is uniquely identifiable, trackable and traceable.

LIST OF REFERENCES

10 First entity/Sealing cap provider
20 Second entity/Transport container/drum provider
30 Third entity/Filler
40 Fourth entity/Distributor
50 Fifth entity/End user
100 Database means/Server, providing cloud-based database service

The invention claimed is:

1. A method for providing secure container verification, comprising:
   providing a first sealing component that is not detachable in an undamaged condition with a first identification that comprises first identification information printed or embedded within the first sealing component and a second sealing component that is not detachable in an undamaged condition with a second identification that comprises second identification information printed or embedded in the second sealing component;
   providing a transport container comprising at least a body and at least a first sealable opening configured to receive the first sealing component, and at least a second sealable opening configured to receive the second sealing component;
   providing a container identification printed or embedded on the body of the transport container, which comprises container identification information;
   sealing the first sealable opening of the transport container with the first tamper sealing component to create a tamper-proof seal;
   electronically scanning, using a scanning device, the first identification and the container identification;
   sending the first identification information and the container identification information to a database;
   storing the first identification information and the container identification information in the database;
   linking the first identification information and the container identification information to create a first combined information;
   filling a transport drum with a filling material via the second sealable opening;
   sealing the second sealable opening of the transport container with the second sealing component to create a second tamper-proof seal;
   electronically scanning, with a scanning device, the first identification, the second identification, and the container identification;

sending the first identification information, the second identification information, and the container identification information to the database;

storing the first identification information, the second identification information, and the container identification information in the database; and linking the first identification information, the second identification information, and the container identification information to create a second combined information, wherein the second combined information represents a physical combination of the transport container, the first sealing component, and the second sealing component, enabling gapless identification, tracking and tracing through the physical seals and stored information.

2. The method of claim 1, wherein a first entity executes at least one of the following:

providing the first sealing component to a second entity; and/or providing the second sealing component to a third entity; and/or wherein the first and second sealing components, once attached to the transport container, are not detachable in an undamaged condition, such that the transport container is sealed in a uniquely identifiable manner.

3. The method of claim 2, comprising wherein the second entity executes at least one of the following:

providing a container identification means on the transport container, sealing the transport container with the first sealing component, in particular the first sealable opening, scanning the first identification and the container identification, and sending the first identification information and the container identification information to the database.

4. The method of claim 2, wherein the third entity executes at least one of the following:

filling the transport drum with a filling material, sealing the transport container, in particular the second sealable opening, with the second sealing component, scanning the first identification, the second identification, and the container identification, and sending the first identification information, the second identification information, and the container identification information to the database.

5. The method of claim 2, wherein:

the first entity is a provider for the first and second sealing component in form of sealing caps, the second entity is a provider of the transport container, and the third entity is a provider for filling the transport container with a filling material.

6. The method of claim 1, wherein the first identification information and the second identification information at least comprise deviating identification numbers.

7. The method of claim 1, wherein the container identification information at least comprises a unique identification number.

8. The method of claim 6, wherein:

the first identification information further comprises at least one additional information, a name and/or a code of a second entity, and/or the second identification information further comprises at least one additional information, a name and/or a code of a third entity, and/or the container identification information further comprises at least one additional information, a name and/or a code of the third entity.

9. The method of claim 1, wherein the first identification, the second identification and/or the container identification is/are provided as a QR code, a data matrix, a human readable code, a data link, or an RFID-chip.

10. The method of claim 1, wherein:

the filled transport container is provided to a fourth entity, a distributor or end user, for receiving the transport container being filled with a filling material and sealed by the first and second sealing components, and the second combined information further comprises at least one information about the fourth entity, including a name and/or a code of the fourth entity.

11. The method of claim 1, wherein each scanning process of at least one of the first identification, the second identification, and/or the container identification for identification and/or tracking and/or tracing of the transport container is sent to and stored in the database and linked to the first and/or second combined information by the database.

12. The method of claim 2, wherein the database comprises multiple authorization levels assigned to different parts of the first and/or second combined information by the database for:

allowing modification of the first and/or second combined information by adding and/or revising additional information to the first and/or second combined information, such as entity names and/or codes, specifications of the filling material, date and time of processing the transport container or the like, and/or allowing access for requesting and receiving information by a requesting entity according to its respective authorization level.

13. The method of claim 1, wherein the first and second sealing components, are provided as sealing caps of different sizes with the first and second identifications applied thereon.

14. The method of claim 1, wherein the database is provided as a server or a network server that provides cloud-based services capable of receiving information, storing information, linking information and/or comparing information for verification thereof and sending at least parts of stored information on request by a requesting entity specifically according to the authorization level of the respective requesting entity.

15. A secure verifiable transport container system, comprising:

a first sealing component that is not detachable in an undamaged condition with a first identification that comprises first identification information printed or embedded in the first sealing component;

a second sealing component that is not detachable in an undamaged condition with a second identification that comprises second identification information printed or embedded in the second sealing component;

a transport container comprising at least a body, at least a first sealable opening configured to receive the first sealing component, and at least a second sealable opening configured to receive the second sealing component;

a drum body with at least the second sealable opening along the drum body; and container identification printed or embedded on the body of the transport container which comprises container identification information;

wherein the first sealable opening is configured to be sealed with the first sealing component to create a first tamper-proof seal;

wherein a transport drum is configured to be filled with a filling material via the second sealable opening before sealing the second sealable opening of the transport container with the second sealing component to create a second tamper-proof seal;

wherein the first identification and the container identification is configured to be electronically scanned by a scanner, sent, and stored in a database that is configured to link the first identification information and the container identification information to create a first combined information;

wherein the first identification, the second identification, and the container identification are configured to be electronically scanned by the scanner, sent, and stored in the database that is configured to link the first identification information, the second identification information, and the container identification information to create a second combined information, wherein the second combined information represents a physical combination of the transport container, the first sealing component, and the second sealing component enabling gapless identification, tracing and verification through the physical seals and stored information.

16. A method for identification and/or tracking and/or tracing of a transport container of claim 15, by a requesting entity, comprising:

scanning at least two of the first identification, the second identification, and/or the container identification, representing identifying information, sending the identifying information to the database;

sending an authorization level of the requesting entity to the database;

comparing the received identifying information with first and/or second combined information as stored by the database for identification of a transport container, comparing the received authorization level of the requesting entity with authorization levels as provided by the database, and providing parts of the first and/or second combined information corresponding to the identifying information and according to the authorization level of the requesting entity by the database to the requesting entity, wherein the parts of the first and/or second combined information as provided by the database represent a result of the verification process of the physical combination of the transport container, the first sealing component, and the second sealing component, such that the physical combination is verifiable.

17. A non-transitory computer-readable media, having stored thereon instructions that, when executed by a computing device, cause the computing device to implement a method of claim 16.

* * * * *